United States Patent [19]
Giles et al.

[11] Patent Number: 5,337,583
[45] Date of Patent: Aug. 16, 1994

[54] REPLACEABLE CLIP

[75] Inventors: Charles Giles, Palm Beach Gardens; Keith Belsom, Stuart; Warren Schuler, Palm Beach Garden, all of Fla.

[73] Assignee: United Technologies Corporation, Hartford, Conn.

[21] Appl. No.: 933,742

[22] Filed: Aug. 24, 1992

[51] Int. Cl.⁵ ............................................. F16B 21/18
[52] U.S. Cl. ................................... 60/752; 24/573.1; 60/39.32; 411/522
[58] Field of Search ................ 24/573.1, 295, 697.1; 411/522, 523, 524, 90, 93, 94, 95; 403/324, 326; 60/752, 39.32

[56] References Cited

U.S. PATENT DOCUMENTS 89,659 5/1869 Hazelton et al. ...................... 411/90
4,790,704 12/1988 Temple et al. ....................... 411/522

FOREIGN PATENT DOCUMENTS 2748823 3/1979 Fed. Rep. of Germany ..... 24/573.1

*Primary Examiner*—James R. Brittain
*Attorney, Agent, or Firm*—Norman Friedland

[57] ABSTRACT

A replaceable clip formed from an elongated bowed member having one end adapted to fit a lug through an aperture and the opposite end fit another lug through a slot. The lugs extend from a panel secured by the clip to an annular shaped shell and the bowed surface bears again the upper surface of the shell to retain the panel while allowing it to grow thermally in both the axial and circumferential directions. The clip is particularly adapted to be used in a transition duct or combustor liner of a gas turbine engine.

7 Claims, 2 Drawing Sheets

REPLACEABLE CLIP

This invention was made under a U.S. Government contract and the Government has rights herein.

TECHNICAL FIELD

This invention relates to clip attachment means and particularly to a clip attachment for attaching the segmented panels in a transition duct that interconnects the combustion section to the turbine section of a gas turbine engine.

BACKGROUND ART

As is well known in the aircraft gas turbine engine art, the combustor and associated transition ducts are typically fabricated with a liner that includes means for cooling the liner and for providing protection against thermal stresses. The type of liner that is the concern of this invention is that type that includes an outer cylindrically shaped shell and a plurality of circumferentially spaced segmented panels that are discretely attached to the shell.

This type of construction is exemplified in U.S. Pat. No. 4,302,941 granted to T. L. DuBell on Dec. 1, 1981 entitled "Combustion Liner Construction for a Gas Turbine Engine" and attachment means are exemplified in U.S. Pat. No. 4,512,159 granted to R. L. Memmen on Apr. 23, 1985 entitled "Clip Attachment" both of which are assigned to United Technologies Corporation, the assignee of this patent application. Liners of the type described in these patents are referred to as Floatwall liners since the panels are adapted to displace axially and circumferentially in response to thermals of the system.

It should be understood that the entire combustor and transition duct may utilize Floatwall liners or either one or the other may utilize this type of construction. In this preferred embodiment the invention will be described in conjunction with the transition duct and is particularly directed to means for curing a problem that had plagued the heretofore known transition ducts utilized in certain gas turbine engines. In particular, existing transition ducts were evidencing a problem with the rear Floatwall panel lug which was wearing completely through the support mechanism or backbone of the transition duct as a result of vibratory and thermal motion interaction. This problem was acerbated because the panel is constructed such that there is only a small contact area between the aft Floatwall lug and the transition duct backbone surface. As a consequence, this wear allows the Floatwall panel to have more motion in the airstream causing progressive wear and loosening at the front panel lug, clip and backbone interface.

Lifting of the Floatwall panel allows hot gases from the engine's gas path to recirculate under the Floatwall panel side edges and cause overheating, blistering and cracks locally on the transition duct backbone. Further wear and loosening of the front Floatwall panel lug attachment has the potential of liberating a floatwall panel into the engine gas path with possible damage to the turbine.

Unsuccessful attempts to find a solution to this problem were made prior to this invention. One such attempt was coating the portions of the transition duct, as for example, the inner rear skit portion of the backbone, in order to prevent the lug from wearing through the backbone. Not only was this attempt unsuccessful, it, in fact, accelerated the wear on the lug contact surfaces. Other types of clips were fabricated and also were tested with unsatisfactory results.

SUMMARY OF THE INVENTION

We found that we could obviate the problems alluded to in the above description by reconfiguring the lug and providing a satisfactory clip that would allow large deflections and high preload. The inventive clip is designed to have a large contact area between itself and the attachment part in comparison with the heretofore known attachment means. Not only does this inventive clip hold the panel securely and prevent wearing through as was the case heretofore, it also is designed to exhibit a predetermined resiliency and flexibility so as to absorb all frequencies and amplitudes encountered.

Accordingly, an object of this invention is to provide improved attachment means for a liner of a duct or combustor for a gas turbine engine that includes a plurality of segmented panels attached to a shell or the like.

A feature of this invention is to provide a clip having means on either end adapted to cooperate with a pair of circumferentially spaced lugs carried by the panels and extending through the shell and a portion of the clip bearing against the surface of the member being attached for preloading the panels to the shell.

Another feature of this invention is a preharden clip formed from a relatively thin flexible and resilient thin elongated member having one end being bifurcated to engage a slot in an upstanding lug and the other end having an aperture fitting over an adjacent circumferentially spaced lug.

Another feature of this invention is to provide an improved clip that is characterized as being easy and inexpensive to manufacture, installable without requiring special tooling, and is replaceable without having to remove the entire duct, permitting installation directly on the engine.

Another feature of this invention is that the repair of the transition duct can be accomplished notwithstanding that the duct may have at the repair juncture a partial or complete wear-through condition.

The foregoing and other features of the present invention will become more apparent from the following description and accompanying drawings.

BEST MODE FOR CARRYING OUT THE INVENTION

Figure 1:
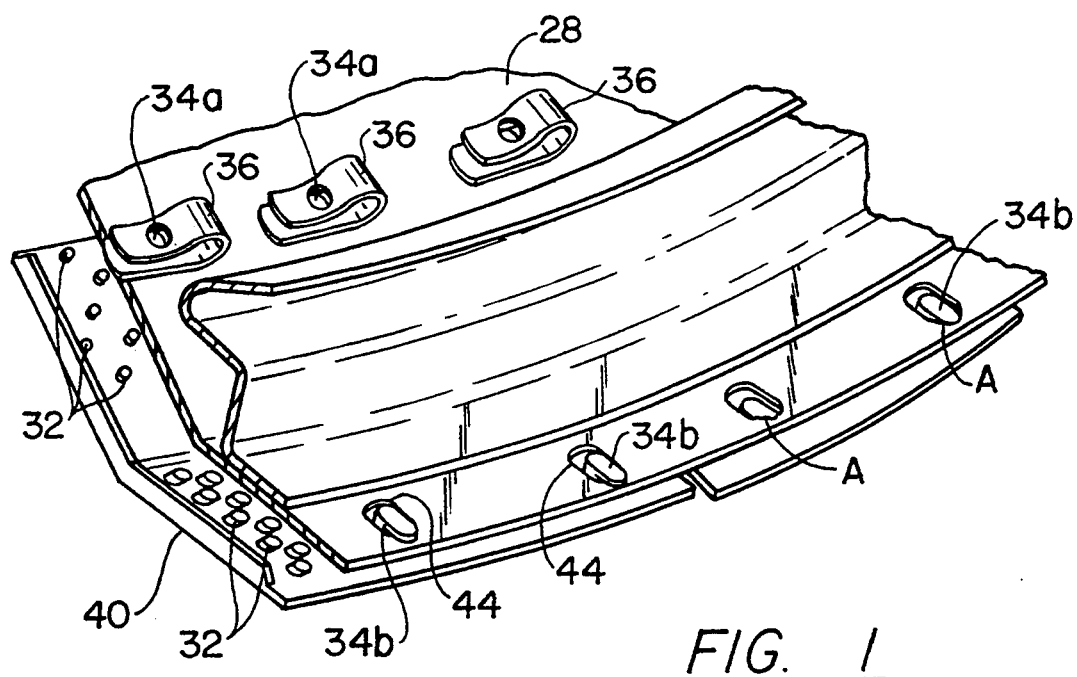
FIG. 1 is a prior art illustration in perspective of a portion of the transition duct of a gas turbine engine.
Figure 2:
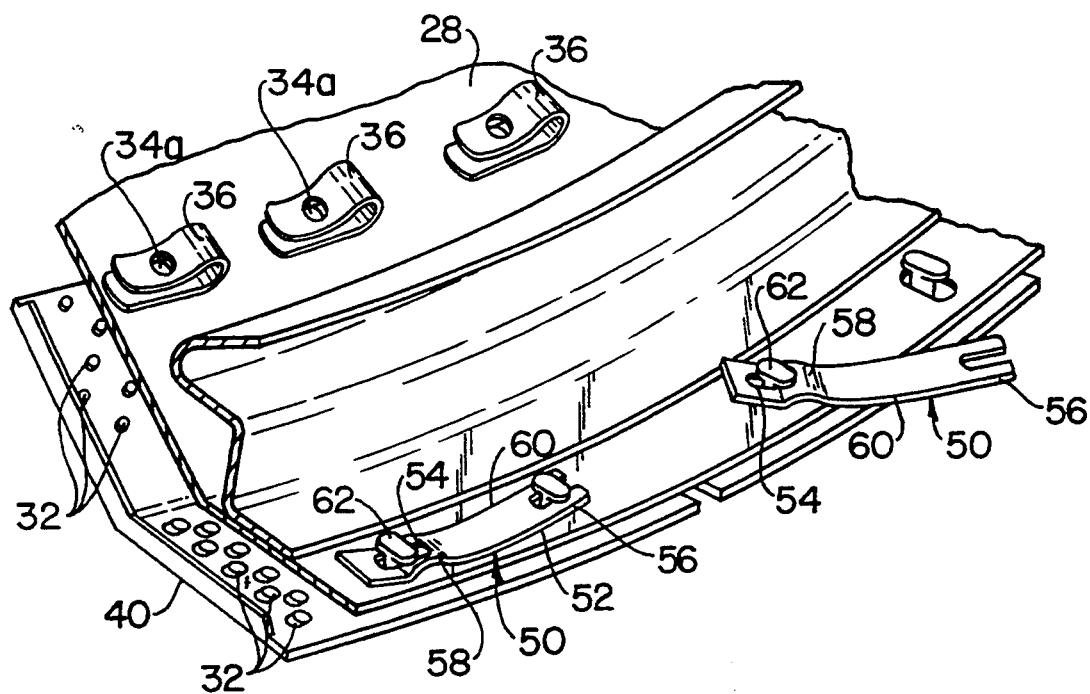
FIG. 2 is a partial view in perspective illustrating the embodiment in FIG. 1 utilizing the invention.
Figure 3:
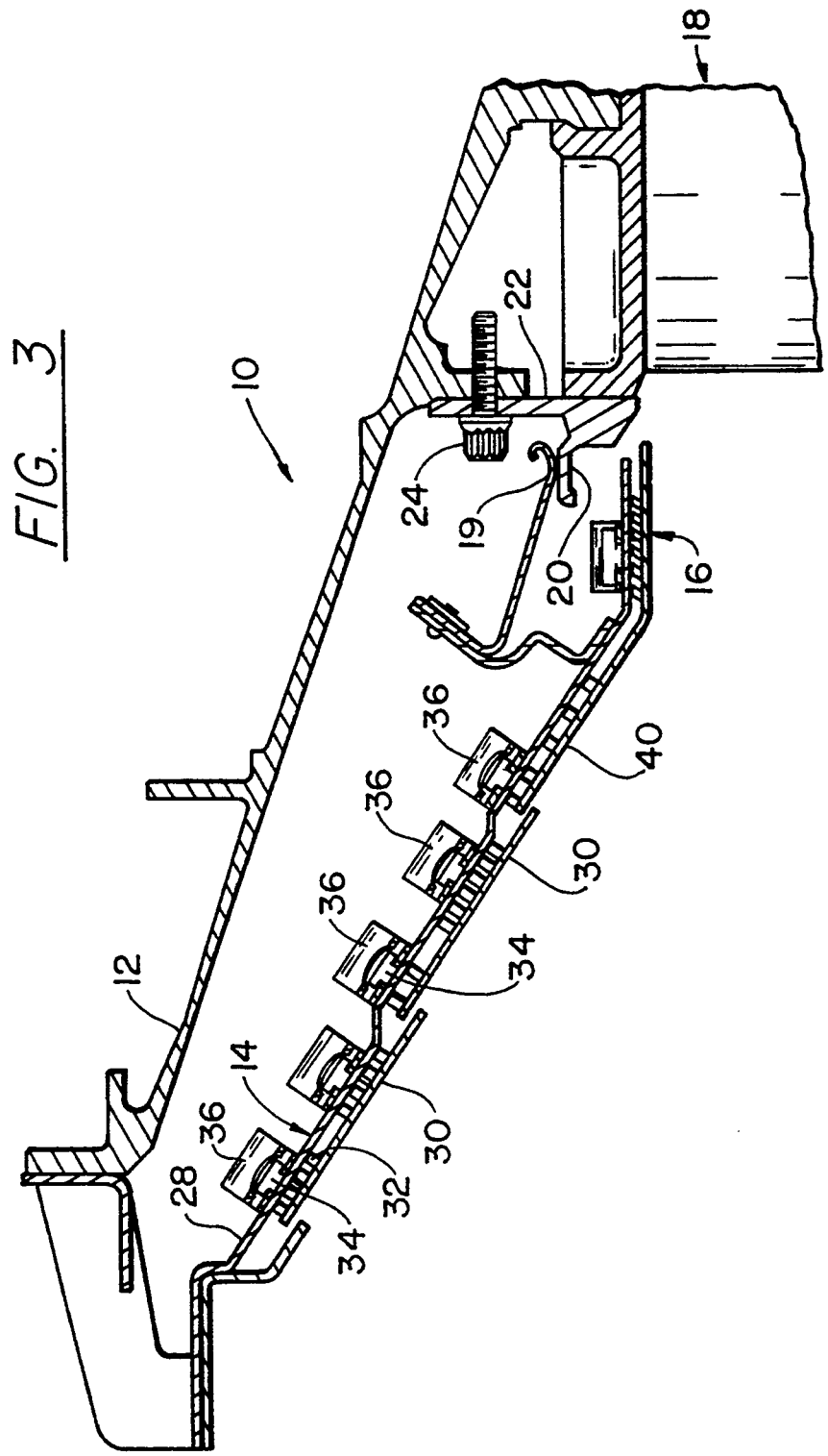
FIG. 3 is a partial view in section of the combustion section showing the transition duct depicted in FIG. 2.

While this invention is being described in its preferred embodiment as being incorporated in on a transition duct in the combustion section of a gas turbine engine, it will be appreciated by those skilled in this art that the teachings of this invention has utility in other applications. As shown in FIGS. 1–3, the combustion section generally illustrated by reference numeral 10 comprises a casing 12 suitably supporting the transition duct 16 in a well known manner. As can be seen in FIG. 3, casing 12 also supports stator vane 18 (only one being shown) of the 1st turbine (not shown). A suitable annular seal 19 is supported to liner 14 and engages flange 20 extending axially from the ring 22 attached to the casing 12 by a plurality of bolts 24 (only one being shown).

Liner 14 which is disclosed in more detail in U.S. Pat. No. 4,512,159, supra, and which disclosure is incorporated herein by reference, consists of a generally cylindrically or conically shaped outer shell 28 and a plurality of circumferentially and axially spaced panels 30, which panels conform in shape so as to be in parallel relationship relative to the portion of the surface of the adjacent shell. Panels 30 include a plurality of spaced projections 32 that extend radially toward the inner surface of shell 28 and define channels for directing cooling air typically bled from the engine's compressor (not shown) to cool the liner.

Panels 30 are suitably attached to the shell by a plurality of spring clips 36 which are fastened to the posts 34 integrally formed on the panels 30 and extending through a hole formed in shell 28 and projecting therebeyond. For details of the spring clip reference should be made to U.S. Pat. No. 4,512,159, supra. This portion of the transition duct is well known in the art and the invention constitutes an improvement over the prior art embodiment that is shown in FIG. 1. The transition duct serves to direct the combustion products (engine's fluid working medium) generated in the combustion section to the turbine section including the stator vanes upstream of the turbine rotor.

To best appreciate this invention reference is made to FIG. 1 which is a perspective view of a portion of the aft end of the transition duct. As noted the aft panel 40 identical to the other panels except it is bent to form a generally L-shaped rectangular segment conforming to the shape of the aft end of shell 28. Each of the circumferencially spaced panels 40 at the aft end of the shell 28 include four posts extending from the proximity of the four corners of panels 40. The fore extending posts 34*a* are identical to the posts 34 of the other panels 30 but the two aft posts 34*b* are in the form of L-shaped lugs adapted to fit into slots 44 formed in shell 28. As alluded to in the above description the lugs had the propensity of wearing through the transition duct as depicted by the referenced by letter A. This problem was solved by incorporation of the clips generally depicted by reference numeral 50 (one being shown assembled and the other being shown as partially assembled) and a modification to the attaching lugs as will be described hereinbelow.

In accordance with this invention the clip 50 is formed from a relatively flat elongated member 52 carrying slot 54 on one end and a bifurcated configuration 56 on the other end. As is apparent from FIG. 2, member 52 is bent radially outward away from the top surface of shell 28 and then radially inward toward the surface of the shell in proximity to slot to form a bowed section 58. Member 52 is further bent radially upward away from the surface of shell 28 to form another bowed section 60 extending from the juncture of the bowed section 58 to the bifurcated end 56. The purpose of this judicious shape is to have the central portion of member 52, at the apex of the bowed portion 60 bear against the top surface of shell 28 to exert an upward force on the T-shaped portion of lugs 62. It will be appreciated from the foregoing that the slot 54 and the distance between the legs in the bifurcation 56 are dimensioned such that the top surfaces adjacent the slot 54 and the bifurcated end 56 underlie the bottom surfaces of the T of the T-shaped lugs. This serves to impart a preload to the panels 40 to assure that the panels are snugly secured relative to the shell but can move circumferentially and radially in response to the thermals occasion by the heat being transferred from the engine's working medium flowing through the transition duct. In accordance with this invention the clips 50 are prehardened and are fabricated from suitable flexible and resilient material such as Waspaloy or Inconel to provide the spring-like fit necessary to allow large deflections and to provide the high preload required, while being able to operate in this hostile environment of a gas turbine engine.

Additionally, the bowed section 58 amd the spring preload when the clip is assembled prevents disengagement of the clip from the "T" shaped lugs when the assembly is subjected to the vibrations normally encountered during aircraft flight.

From actual tests of the inventive configuration as described, the clips have held the panel securely in conditions exceeding what is normally encountered during aircraft flight conditions. The spring action provided by the clips absorbed all frequencies and amplitudes normally experienced under flight conditions.

What has been shown by this invention is a simple to manufacture and install clip that has obviated a problem that has plagued industry for some time. Moreover, the clips can be installed on the engine without having to remove the transition duct. It can be installed on existing transition ducts with partial or complete wear through without repair of the duct, itself, which is the current heretofore known practice. And unlike clips typically utilized in this application, these clips can be installed with the use of common hand tools rather than the special tooling heretofore used.

Although this invention has been shown and described with respect to detailed embodiments thereof, it will be appreciated and understood by those skilled in the art that various changes in form and detail thereof may be made without departing from the spirit and scope of the claimed invention.

What is claimed:

1. In combination, a combustor for a gas turbine engine including a liner comprising a cylindrical shell having an outer and inner surface, axial and circumferentially spaced segmented panels in contiguous relationship with said inner surface, said panels including at least two adjacent axially spaced lugs having shoulder means formed thereon extending beyond the outer surface of said cylindrical shell through a pair of complementary holes formed in said cylindrical shell, means for securing said segmented panels to said cylindrical shell, said means comprising a flexible elongated member having a slot formed adjacent one end and a bifurcation formed adjacent the opposing end thereof, said flexible elongated member having an upper surface and a lower surface and being bowed having its apex facing in the direction so said cylindrical shell and disposed substantially at the mid-section between said one end and said opposing end of said flexible elongated member, said slot fitting over one of said lugs and the bifurcation fitting over the other of said lugs and both being in frictional engagement with said shoulder means to load said flexible elongated member so that said lower surface at said apex engages said cylindrical shell to exert an upward force on said panel to preload said panel relative to said cylindrical shell.

2. The combination as claimed in claim 1 wherein said shoulder means of each of said lugs includes a pair of laterally extending legs defining with each of said lugs a T-shaped configuration and said upper surface of said flexible elongated member underlies the under surface of said legs of said T-shaped configured lugs adjacent said slot and adjacent said bifurcation.

3. The combination as claimed in claim 2 wherein said member includes a first bowed portion adjacent said slot and having a first apex facing away from the upper surface of said shell and said bowed portion at said mid-section extending from the end of said first bowed section to the end of said member adjacent said bifurcation and having its apex facing said upper surface of said shell, whereby said flexible elongated member spring loads said panels to said shell through said lugs.

4. Means adapted to secure and preload a segmented panel to a shell in which the panel includes at least two adjacent axially spaced lugs having shoulder means formed thereon extending beyond the outer surface of said shell through a pair of complementary holes formed therein, said means comprising a flexible elongated member having a slot formed adjacent one end and a bifurcation formed adjacent the opposing end thereof, said flexible elongated member having an upper surface and a lower surface and being bowed having its apex facing in the direction of said shell and disposed in substantially the midsection between said one end and said opposing end of said flexible elongated member, said slot fitting over one of said lugs and the bifurcation fitting over the other of said lugs and both being in frictional engagement with said shoulder means to load said flexible elongated member so that said lower surface at said apex engages said shell to exert an upward force on said panel to preload said panel relative to said shell.

5. Means as claimed in claim 4 wherein said shoulder means of each of said lugs includes a pair of laterally extending legs defining with each of said lugs a T-shaped configuration and said upper surface of said flexible elongated member underlies the under surface of said legs of said T-shaped configured lugs adjacent said slot and adjacent said bifurcation.

6. Means as claimed in claim 4 wherein said member is prehardened before being assembled to said lug.

7. Means as claimed in claim 5 wherein said member includes a first bowed portion adjacent said slot and having a first apex facing away from the upper surface of said shell and said bowed portion extending from the end of said first bowed section to the end of said member adjacent said bifurcation and having its apex facing said upper surface of said shell, whereby said flexible elongated member spring loads said panels to said shell through said lugs.

* * * * *